3,003,986
PROCESS OF EMULSION POLYMERIZATION OF ETHYLENICALLY UNSATURATED MONOMERS UTILIZING TAYLOR RING FLOW PATTERN
Francis John Long, Beaconsfield, England, assignor to Imperial Chemical Industries Limited, Millbank, London, England, a corporation of Great Britain
Filed July 5, 1957, Ser. No. 670,315
Claims priority, application Great Britain July 6, 1956
3 Claims. (Cl. 260—29.6)

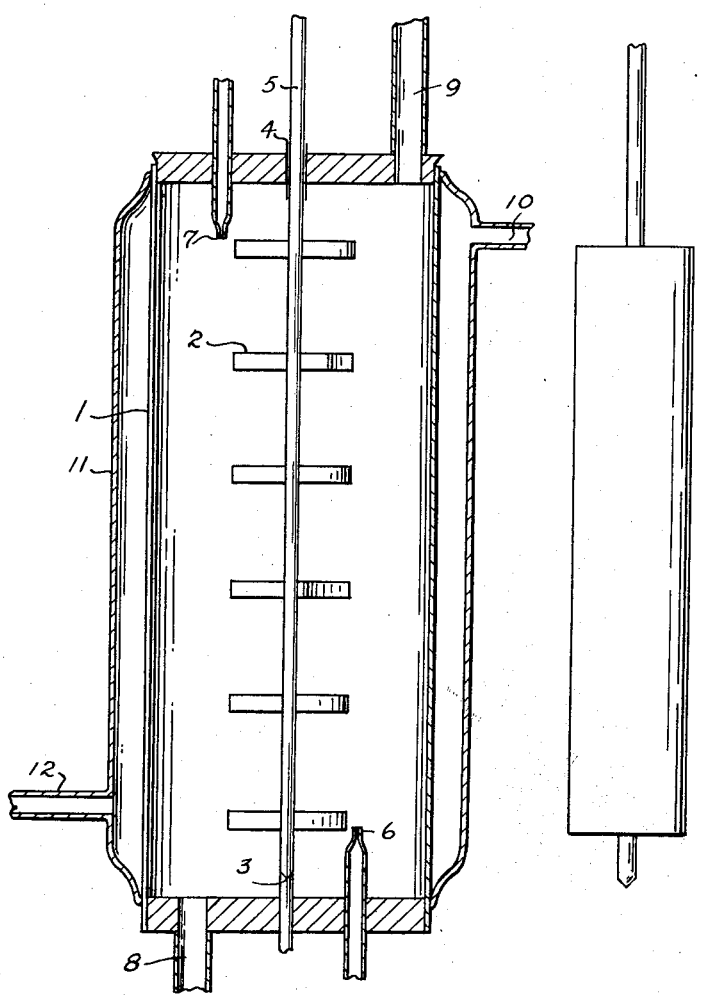
FIG. I        FIG. II
INVENTOR
FRANCIS JOHN LONG
BY Cushman, Darby & Cushman
ATTORNEYS

United States Patent Office 3,003,986
Patented Oct. 10, 1961

This invention provides an apparatus in which continuous emulsion polymerisation may be carried out.

My invention provides a continuous emulsion polymerisation apparatus which comprises a reaction vessel fitted with a stirrer of the type hereinafter described, which vessel is equipped, adjacent to the stirrer, with inlets for fine streams of fluid and with an outlet.

The stirrer for use in this invention is designed to produce mainly rotational movement of the liquid in the reaction vessel, the geometry of the stirrer and vessel being such that a pattern of Taylor rings is produced in a liquid in the vessel when the stirrer is in use. The term "Taylor rings" is used to denote a particular flow pattern, such a flow pattern being one in which the stirred liquid under consideration is segmented in planes perpendicular to the principal axes of the vessel, and of rotation of the stirrer, with much higher rates of mass transfer within than between such segments and well defined boundaries separating the segments. Suitable forms of stirrer which provide these conditions include, for example, cylindrical or cone shaped stirrers, and stirrers made from discs, segmented discs, annular rings and the like, spaced regularly or irregularly on a shaft. Conveniently the inlets may be adjacent to opposite ends of the stirrer and they may in fact be ports in a hollow stirrer which itself acts as a conduit for the fluids to be added to the reaction vessel. These arrangements enable fluids entering the vessel to be dispersed rapidly in the Taylor rings.

In a preferred form of my apparatus the reaction vessel is a vertical cylinder and the outlet is at the bottom of the cylinder.

In one form of my invention the upper end of the reaction vessel is also equipped with a reflux condenser. In addition, or alternatively, the vessel may be fitted with a jacket through which heating or cooling fluid may be passed or with internal heating or cooling tubes. Cooling or heating may also be carried out by passing an appropriate fluid through a hollow stirrer. By fitting appropriate pressure-tight bearings and joints our apparatus may be modified for use for the polymerisation of monomers at super- or sub-atmospheric pressures.

In a further preferred form of my invention the stirrer consists of a plurality of discs or annular rings on a shaft, the design and peripheral speed of the stirrer being such that a number of Taylor rings is formed.

A preferred form of my apparatus is shown in the Diagram 1 accompanying the specification.

A cylindrical reaction vessel 1 is fitted with a rotating disc stirrer 2, supported on bearings 3 and 4. The stirrer 2 can be rotated by turning a shaft 5. The vessel 1 is equipped with upper and lower jets 7 and 6 respectively, an outlet 8 and a reflux condenser (not completely shown) 9. The vessel 1 is surrounded by a jacket 11 with entry and exit pipes 10 and 12. This jacket can be used to circulate fluid to supply or remove heat from the reaction vessel 1.

The dimensions of my apparatus are obviously dependent on the output of emulsion required and we have found that suitable stirring can be obtained when a stirrer of diameter 1.5 inches is rotated in a vessel of internal diameter 2.3 inches at between 500 and 1500 r.p.m. or a stirrer of 4 inches diameter in a vessel of 6 inches diameter at between 100 and 1000 r.p.m. The preferred speed for the larger stirrer is between 440 and 880 r.p.m.

The method of use of my apparatus can best be explained by actual examples of its use for the preparation of stable polymer emulsions. All parts are by weight in Examples I, II and III.

Example I

With an apparatus having a cylindrical stirrer 13 as shown in Diagram 2 of the drawings, an aqueous solution, containing 84 parts polyvinyl alcohol, 7.5 parts ammonium persulphate and 6 parts sodium carbonate in 1247 parts of water, was added to the vessel 1 through the jet 7. Vinyl acetate was added through the jet 6. By passing water through the jacket 11 the reactants were maintained at about 60° C.

The stirrer 13 was rotated at 600 r.p.m. and was breaking up the filamentary streams of reactants entering the vessel into fine particles. When the apparatus reached a steady state, i.e. material was flowing from the outlet 8 at the same rate as reactants were being added to the substantially full vessel, the constants of the emulsion emerging from the outlet 8 were determined. The rates of addition of monomer and solution at steady state were 3.6 and 3.75 parts/min. respectively. The solids content of the polymer emulsion discharge from the outlet 8 was approximately 50% by weight, the monomer content 0.5% and the viscosity 2–3 poises (measured by an Ultraviscoson). The average particle size was $0.5\mu$ and the average time of stay was 2 hours 20 minutes.

Example II

Example I was repeated this time with the speed of rotation of the stirrer increased to 1150 r.p.m. The flow rates into the vessel of monomer and solution were 3.7 parts and 6.2 parts/min. respectively. The constants of the product were:

Solids_____ 42%.
Viscosity_____ 1.5–2 poises (Ultraviscoson).
Particle size_____ $0.75$–$1.0\mu$.
Average time of stay_____ 1 hr. 50 mins.

Example III

The vessel was this time charged with 1 litre aqueous medium containing:

(a)

242 parts of a 13% ammonium polymethacrylate solution in water
25 parts Calsolene oil (50% solution in water of sodium salt of sulphated methyl oleate)

and heated to 80° C. while the stirrer was rotated at 600 r.p.m. 280 parts of an aqueous catalyst solution containing:

(b)

25 parts Calsolene oil
5 parts 100 volume hydrogen peroxide solution
250 parts water were then added and pure methyl methacrylate monomer fed in at the lower jet at 4.5 ml./min. After 1.5 hours further aqueous medium (a) to which had been added 20 ml. 100 volume hydrogen peroxide was fed at 3.75 ml./min.

After 3¾ hours from catalyst solution addition the creamy emulsion leaving the reactor contained 48.4% solids. The average particle size was about $0.75\mu$ and the viscosity 0.4 poise (Ultraviscoson).

Example IV

A vessel similar to that shown in the diagram accompanying the complete specification in which the vessel was 6 inches in diameter and equipped with a stirrer consisting of a vertical cylindrical shaft fitted with discs of 4 inches diameter mounted axially on the shaft and rotated at 660 r.p.m. was supplied with monomer and catalyst, etc. The feed-rate of vinyl acetate monomer was 5.82 kg./hr. and of aqueous solution (containing polyvinyl alcohol 3.25% by weight, ammonium persulphate 0.5%, sodium carbonate 1.6%, water 94.65%) 4.35 kg./hr. On reaching the steady-state the product, with an average time of stay of 50 minutes, contained 55% by weight of solids, 2% of monomer. The average emulsion particle size was approximately 1.5µ.

When a steady state has been reached in my preferred apparatus the mechanism of reaction is thought to be as follows. As stated earlier the streams from the jets are rapidly broken down to fine particles by the rotating stirrer. Now since the aqueous solution which enters via the upper jet is heavier than the monomer which enters through the lower jet countercurrent flow develops and polymerisation proceeds. This countercurrent movement of the reagents has the advantage that as the monomer is consumed by reaction during its movement up the vertical series of Taylor rings in the vessel it passes into regions of progressively higher catalyst concentration. Conditions of near uniformity of reaction rate thus obtain throughout the column which represent the most efficient use of the available reactor volume for reaction. Since the orifice of the jet 6 is substantially higher than the outlet 8 very little monomer is mixed with the product.

The polymer dispersion produced in my preferred apparatus on sinking past the orifice of the jet 6 is mixed with no further monomer and so any monomer mixed with it tends to polymerise or diffuse up the vessel before the dispersion passes through the outlet 8 at the bottom of the reaction vessel.

From the above it will be appreciated that many monomers can be polymerised in my apparatus provided suitable catalysts, flow rates, temperatures, pressures, and stirring speeds are chosen. Typical examples of these giving aqueous emulsions have been given in the examples. Others include such vinyl type monomers as styrene, vinyl toluene, vinyl and vinylidene chlorides and acrylonitrile, esters of acrylic and methacrylic acids such as methyl, ethyl, butyl methacrylate and ethyl acrylate, olefinic type monomers such as ethylene, propylene, butadiene and combinations of monomers to give copolymer emulsions such as styrene-butadiene and methyl methacrylate-butadiene. Alternatively, the apparatus may be used for emulsion polymerisation in non aqueous systems such as those described in the co-pending U.S. patent application Serial No. 735,683, filed May 16, 1958, which discloses the polymerisation of various vinyl type monomers in certain organic liquids in the presence of a colloidal additive and optionally a surface active agent.

The design of suitable apparatus in which emulsion polymerisation may be carried out in accordance with my invention can be changed in various ways from that shown in the accompanying diagram. For example, it is possible to substitute for the fluid inlet jets shown sinter plates which produce fine streams of particles of fluid. The stirrer may be modified provided the stirring conditions detailed above still obtain, but the form detailed in Example IV where the particular design of stirrer concerned has the advantage of giving a greater volume available for reaction for given reactor dimensions and impresses upon the fluid a particularly desirable internal flow pattern, is preferred. By increasing the distance between the lower inlet and the outlet pipe, for example, by raising the lower jet relative to the stirrer, the percentage of monomer flowing out with the product is substantially reduced.

I have found that space time yields are higher and emulsions of polymerised vinyl acetate are better, when prepared in my apparatus, than when similar emulsions are prepared by other means.

Even more important for bulk production of emulsion polymers, rates of reaction are higher and the product from our apparatus is more uniform than that available from batch reactions.

What I claim is:

1. A process of continuous emulsion polymerization comprising the steps of feeding a stream consisting essentially of ethylenically unsaturated monomer and a stream of catalyst into a reaction zone in counter-current flow to each other, stirring the contents of said zone with a stirrer to produce a vertical flow pattern of Taylor rings in which the stirred liquid is segmented in planes perpendicular to the principal axis of the vessel and to the axis of rotation of the stirrer with much higher rates of mass transfer within than between said segments and well defined boundaries separating the segments, and withdrawing a polymer dispersion from the bottom of said zone.

2. A process as set forth in claim 1 wherein the stream of catalyst is an aqueous solution which is introduced at the top of the series of Taylor rings, the unsaturated monomer being introduced at the bottom of said series of Taylor rings.

3. A process as defined in claim 1 in which the unsaturated monomer is introduced at a point above the bottom of said zone, whereby the polymer dispersion passes through a space of low monomer concentration below the monomer inlet, before withdrawal from the bottom of said zone.

References Cited in the file of this patent

UNITED STATES PATENTS

| | | |
|---|---|---|
| 1,560,826 | Kirschbraun | Nov. 10, 1925 |
| 2,580,315 | Park | Dec. 25, 1951 |
| 2,611,762 | Luce | Sept. 23, 1952 |
| 2,635,086 | Norris | Apr. 14, 1953 |
| 2,655,496 | Adams | Oct. 13, 1953 |
| 2,689,242 | Lucht | Sept. 14, 1954 |
| 2,742,348 | Spence et al. | Apr. 17, 1956 |
| 2,745,823 | Hewitt | May 15, 1956 |

FOREIGN PATENTS

| | | |
|---|---|---|
| 458,648 | Canada | Aug. 2, 1949 |
| N1,745 | Germany | May 9, 1956 |

OTHER REFERENCES

Bovey et al.: "Emulsion Polymerization," "High Polymers," volume IX, pages 282, 283 (1955), Interscience Publishers, Inc., New York.